Patented June 25, 1946

UNITED STATES PATENT OFFICE 2,402,909

2,402,909

COMPOUNDING OF BUNA S WITH BLOWN OILS

Izador J. Novak, Trumbull, Conn., assignor to Raybestos-Manhattan, Inc., Passaic, N. J., a corporation of New Jersey No Drawing. Application February 20, 1943, Serial No. 476,629

8 Claims. (Cl. 260—23)

This invention relates to improvements in the compounding of the synthetic rubber or rubbery copolymer of butadiene-1,3 and styrene known as Buna S, and particularly to the plasticization thereof so as to impart to the product specific desirable properties.

Buna S, which is a linear and cross-linked copolymer resulting from the catalytic polymerization of an emulsion of butadiene and styrene, while superior to natural rubber in some respects, has been found to be inferior in others, and particularly in respect to processing difficulties, and the ability to form a product which has the desirable properties of extensibility and elasticity, resiliency (i. e., low hysteresis), low heat build-up, good tack or adhesion and resistance to extremes of temperature.

In particular I have found that the ability to satisfactorily compound Buna S and to enable it to be processed by conventional rubber equipment and technique and to form products having the aforementioned desirable properties, is to a large extent dependent upon the initial plasticization treatment thereof, and particularly in the nature of the plasticizing agent, conventional natural rubber plasticizing agents having been found to be unsatisfactory.

It is therefore an object of this invention to compound Buna S and particularly to plasticize it by means of novel plasticizing material so as to enable the production of more rubber-like Buna S products as evidenced by greater liveliness and lower internal friction.

In accordance with the present invention I have found that a vegetable or fish oil capable of producing a factice and which is compatible with and soluble in Buna S and which permits a co-vulcanization of the solution of the oil in the Buna S by means of sulphur, forms a good plasticizing agent therefor. Such plasticization permits the Buna S to be readily compounded and milled by means of conventional rubber rolling mills or internal type mixers, and enables the production of vulcanized products of good physical properties such as excellent tensile strength, plasticity, and heat build-up properties, high elongation, low modulus, good rebound, tack and electrical properties, much improved resistance to heat embrittlement, and with little if any effect on the known good abrasion resistance of Buna S.

The oils which I have found to be useful may be vegetable or fish oils of the drying, semi-drying or non-drying type and includes such oils as linseed, soya bean, hempseed, oiticica, Perilla, menhaden, pilchard and the like which are capable of forming a factice on vulcanization with sulfur. Although the foregoing specifically enumerated and other oils are useful in the blown or unblown state, certain oils such as castor oil and China-wood oil are useful preferably only in the blown state. It will therefore be understood that the oil capable of producing a factice, or oil capable of producing a factice on vulcanization with sulfur, as used in the within specification and claims is intended to include those vegetable or fish oils either thus generically designated, or individually and specifically designated, which are capable of being vulcanized with sulfur in either the fluid, blown, gelled blown or unblown state, or the blown state alone, and to exclude all other oils.

In order to obtain the maximum of the foregoing desirable properties I have found that the most satisfactory form of oil is one which has been air or oxygen blown to an extent where it has a viscosity of from about 10 to about 20 poises at normal room temperature or about 72° F., the blowing preferably having been carried out at a low temperature such as about 25 to about 70° C. Although I may with substantially equal effect use an oil blown to a temperature as high as 180° C., the low temperature blown oil is preferable since it is more uniform, that is, it contains less unblown oil and break-down products, and produces better tensile and elastic properties. On the other hand I may use the oil blown to the gelled state, that is, blown directly to a gel or first blown and then heat gelled, or use it in the fluid condition in viscosities ranging from about 2 to about 100 poises at 72° C., or even in an entirely unblown condition, if it is a factice forming oil in such condition, dependent on the nature of the ultimate product desired or the use or purpose thereof. It will therefore be understood that although I may use either unblown, fluid blown, or gelled blown oils of the factice forming type for the plasticization of Buna S, each of these oils or the forms of the particular oil produced as previously set forth is not necessarily equivalent in the character of the result produced, and with the various oils and forms varying proportions to accomplish related results may be required, although all forms show marked improvement over standard natural rubber plasticizers in producing Buna S stocks having low heat build-up and low hysteresis loss under mechanical stress.

Thus I have found that for the best products, such as those suitable for use in the carcass of a tire it is preferable to use from about 10 to about 20 parts by weight on 100 parts of Buna S, of the oil which has been blown at a temperature of from about 25 to about 70° C. and having a viscosity of from about 10 to about 20 poises at normal room temperature or about 72° F. Such proportions give an unvulcanized compound of the highest tack required for cloth lamination and for permitting adhesion by contact of plies such as in the building up of a tire carcass, and permits frictioning or skim coating by means of conventional calendering apparatus. Such formulation also permits the production of thin wall extruded products and permits better spreading in calendering operations. Tread type stocks may use from about 5 to about 10 parts of the 10 to 20 poise at 72° F. oil to produce satisfactory Buna S: carbon black stocks.

As previously indicated, oils of greater or lesser viscosity than the foregoing preferred range are useful although for non-equivalent purposes and in varying character of the product. Thus as the viscosity of the oil increases beyond about 20 to 25 poises and approaches the gel stage, the tack drops off, although good tack is still obtainable even with the fully gelled oil. On the other hand oil of lower viscosity, such as the unblown or mildly blown oil may be used in the proportion of from about 5 to about 10 parts or Buna S in the compounding of stocks requiring moderate improvement in plasticity and lower tack, such as in thick extrusion products, mechanical rubber goods, and certain tire tread compounds.

In a modified method of compounding Buna S I may replace about one-half of the indicated amount of oil, particularly the fluid blown form by rosin, with the result that slightly higher tensiles but lower elongations are obtained in the vulcanized product than when using the full amount of oil alone. In this respect it is important to point out, however, that rosin alone in any proportion is not useful as a plasticizer for Buna S.

The processing or compounding may be carried out by means of conventional equipment such as a rubber mill or internal type mixer such as a Banbury mixer, and is preferably conducted with the rolls or mixer maintained cold for best results. For example in a mill mixing operation the Buna S is preferably first broken down in a tight cold mill, the plasticizer then added in small increments, and thereafter the pigments or blacks are added. Toward the end of the mixing schedule the sulphur and accelerators may be added, followed by remilling after aging, with the result that the Buna S compounded with my plasticizer produces a stock of greatly reduced nerve.

It is important to point out that although the plasticizers of this invention are characterized as being of the factice producing type, the manner of their use, function and resultant effect is distinct from the well known use of a factice in the compounding of natural rubber, such former use having been in the addition of the vulcanized oil or factice to the rubber as a filler or adulterant. In my process the oil is added before vulcanization, and for the purpose of acting as the essential plasticizing agent, and only thereafter is the oil co-vulcanized with the Buna S in an otherwise generally conventional rubber compound, with apparent uniform rapidity of vulcanization as distinguished from the relatively slow vulcanization of a factice per se, to result in a compound of improved processing qualities and in mutual beneficial modification in the final vulcanized product.

One of the particular advantages arising out of use of my plasticizers is that they may be used in greater amounts than has been possible heretofore in the attempt to plasticize Buna S with commercial natural rubber plasticizers, without reducing the physical properties of cured blends to the extent which results when using equal amounts of such commercial plasticizers, the addition greatly reducing the "nerve" of the uncured compound, greatly improving the plasticity and permitting better extrusion and calendering of the blends. This leads to easier processing without sacrifice of quality. The low heat build-up imparted to the Buna S compounds with the use of my plasticizers is especially of value in tire carcass compounding.

The advantages and results obtainable by the use of my plasticizers in the compounding of Buna S in typical compounds is shown by the following comparative tables, which should be considered as illustrative and not for the purpose of limiting the scope of my invention. Thus for the purpose of better comparison, in all of the following examples the indicated plasticizer used was a fluid low temperature air blown linseed oil having a viscosity of from about 10 to about 20 poises at 72° F. All proportions are shown in parts by weight.

Table I

|  | Compound No. | | | |
|---|---|---|---|---|
|  | 1 | 2 | 3 | 4 |
| Buna S | 100 | 100 | 100 | 100 |
| Channel Black | 50 | 50 | 50 | 50 |
| Zinc oxide | 5 | 5 | 5 | 5 |
| Stearic acid | .5 | .5 | .5 | .5 |
| Sulphur | 1.5 | 1.5 | 1.5 | 1.5 |
| Benzothiazol disulphide | 1.5 | 1.5 | 1.5 | 1.5 |
| Plasticizer | | 5 | 10 | 20 |
| Optimum cure time, mins. at 287° F | 60 | 60 | 60 | 90 |
| Tensile p. s. i | 3,030 | 3,062 | 3,050 | 2,916 |
| Percent elongation | 430 | 630 | 670 | 780 |
| Modulus 300% E | 2,040 | 1,242 | 1,050 | 460 |
| Modulus 500% E | | 2,235 | 1,990 | 1,455 |
| Shore Hardness taken 24 hours after cure | 68 | 67 | 65 | 63 |

The foregoing table illustrates that the addition of my plasticizer to a Buna S-Channel Black compound results in lower moduli, higher elongations, and lower durometer hardness values. The tensile values are of the same order regardless of the amount of plasticizer added up to about 20 parts on one hundred Buna S.

The addition of 20 parts of the same plasticizer to a semi-reinforcing channel black stock was tested for its effect on the phenomenon of overcuring. At the end of a 19 hour cure at 287° F. the tensile, elongation and hardness had increased compared to the one hour cure. The modulus at 300% elongation had remained the same. This blend showed no signs of over-curing, other than hardness, over the long curing time.

The comparative effect of the use of a modified form of my plasticizers composed of 50% by weight of rosin and 50% by weight of a blown oil plasticizer similar to that of the foregoing examples indicates that slightly higher tensile and lower elongation result thereby, as shown by the following comparative results:

Table II

|  | Compound No. | |
|---|---|---|
|  | 5 | 6 |
| Plasticizer | 6 | |
| 50% rosin—50% plasticizer | | 6 |
| Opt. cure at 290° F. mins | 60 | 60 |
| Tensile p. s. i | 2,810 | 3,000 |
| Per cent elongation | 740 | 700 |
| Modulus at 300% E | 650 | 710 |
| Modulus at 500% E | 1,355 | 1,480 |

Three blends, one with medium sulphur and two with high sulphur, were aged in a Geer oven and oxygen bomb. Using the same plasticizer as in the foregoing examples the oxygen bomb aging showed little or no effect on the tensile and elongation values. On the other hand a conventional and commercial coal tar hydrocarbon oil rubber plasticizer tested under the same conditions showed reduced tensile and elongation values. Air oven aging resulted in slightly increased tensile values using my plasticizer with decreased elongation values. As compared to this the commercial rubber plasticizer showed greater loss in elongation and tensile values.

The following Table III illustrates that the addition of my plasticizer to a channel black tread type stock in compounds Nos. 7 and 8, similar to those of Nos. 3 and 4 of Table I, resulted in good rebound properties which increased with increase in temperature. The heat build-up was low for this type of compound. Compared to the use of a commercial type of coal tar hydrocarbon oil rubber plasticizer as typified by compound No. 9, the use of my plasticizer shows low heat build-up and less distortion of sample slugs during the test operation. Whereas the Buna S compounded with the commercial rubber plasticizer became distorted to such an extent that it would not remain in the test machine, the test slug of the compound embodying my plasticizer remained in the test equipment under a 192 pound load. When it is considered that a hard channel black was used in this series of tests, the low heat build-up of the stock utilizing my plasticizer is noteworthy. This comparative test data is shown in the following Table III.

*Table III*

|  | Compound No. | | |
| --- | --- | --- | --- |
|  | 7 | 8 | 9 |
| Buna S | 100 | 100 | 100 |
| Channel Black | 50 | 50 | 50 |
| Zinc oxide | 5 | 5 | 5 |
| Sulphur | 1.5 | 1.5 | 1.5 |
| Benzothiazol disulphide | 1.0 | 1.0 | 1.0 |
| Di-ortho-tolylguanidine | .5 | .5 | .5 |
| Plasticizer | 10 | 20 |  |
| Commercial rubber plasticizer |  |  | 10 |

60 MIN. CURE AT 287° F.

| | | | |
| --- | --- | --- | --- |
| Per cent rebound at 72° F | 40.7 | 36.9 | 40.2 |
| Per cent rebound at 212° F | 49.1 | 42.8 | 39.4 |
| Per cent increase at 212° F | +20.6 | +16.0 | −2.0 |

GOODRICH FLEXOMETER HEAT BUILD-UP

[Conditions: .125 inch stroke—148 lb. load]

| | | | |
| --- | --- | --- | --- |
| Initial dynamic compression | .234 | .242 | .419 |
| Final dynamic compression | .310 | .350 | .575 |
| Dynamic compression drift | .76 | .108 | .156 |
| Initial temperature, ° C | 28.8 | 29.0 | 32.7 |
| Final temperature, ° C | 87.6 | 89.6 | 136.4 |
| Temperature increase, ° C | 58.8 | 60.6 | 103.7 |
| Time of run, mins | 30 | 30 | 30 |

[Conditions: .125 inch stroke—192 lb. load]

| | | | |
| --- | --- | --- | --- |
| Initial dynamic compression | .295 | .335 | .460 |
| Final dynamic compression | .400 | .475 | .600 |
| Dynamic compression drift | .105 | .140 | .140 |
| Initial temperature, ° C | 27.4 | 26.9 | 35.6 |
| Final temperature, ° C | 101.8 | 112.0 | 131.5 |
| Temperature increase, ° C | 74.4 | 85.1 | 95.9 |
| Time of run, mins | 30 | 30 | [1] 7 |

[1] Sample slid out of machine.

The foregoing data on heat build-up was substantiated and expanded by a series of tests incorporating increasing quantities (5 to 25 parts) of the same plasticizer as used in all of the within examples (10 to 20 poise low temperature blown linseed oil) in a carbon black tread stock similar to compound Nos. 1 and 2 of Table III, these tests showing that the hysteresis loss remained practically constant through the series, as against all the well known plasticizers for natural rubber which increase hysteresis loss as more is added. This characteristic makes it possible to produce soft, tacky, easy extruding tread stocks which do not harden in use to a brittle point, and to do this while maintaining resilience and low heat build-up properties.

Samples of Buna S containing 50 parts of semi-reinforcing channel black on 100 parts of Buna S and plasticized with six parts by weight of my aforesaid plasticizer, or my 50 per cent rosin plasticizer, remained flexible after four days at −50° C.

The electrical properties of Buna S compounded with my plasticizer have been found to be comparable to those exhibited by the use of commercial rubber plasticizers.

Tear resistance which is greatly influenced by the degree of black dispersions has been found to be high in Buna S black compounds, compounded with my plasticizer and excellent results have been obtained on compounds of the carcass type.

A test developed by one of the major carbon black suppliers determines the number of seconds which elapse between the contact of a hot surface and the breaking of a sample cut from a test sheet. Whether the test shows high temperature tensile, elongation, or tear, the fact is that many Buna S compounds break in a few seconds. A carcass compound similar to the foregoing examples containing 10 parts of the plasticizer on 100 parts of Buna S lasted 187 seconds. A similar compound without the use of my plasticizer broke in 4 seconds.

I claim as my invention:

1. A compound of the rubbery copolymer of butadiene-1,3 and styrene containing a blown oil capable of producing a factice on vulcanization with sulphur as the plasticizer therefor, said oil having a viscosity of from about 10 to about 20 poises at 72° F. and being in the proportion of from about 5% to about 25% by weight of the copolymer.

2. A compound of the rubbery copolymer of butadiene-1,3 and styrene containing a blown oil capable of producing a factice on vulcanization with sulphur as the plasticizer therefor, said oil having a viscosity of from about 10 to about 20 poises at 72° F. and being in the proportion of from about 10% to about 20% by weight of the copolymer.

3. A compound of the rubbery copolymer of butadiene-1,3 and styrene containing a plasticizer therefor composed of approximately equal parts by weight of rosin and a blown oil capable of producing a factice, the oil having a viscosity of from about 10 to about 20 poises at 72° F., the plasticizer being in the proportion of from about 5% to about 25% by weight of the copolymer.

4. The method of forming a composition of the rubbery copolymer of butadiene-1,3 and styrene which comprises milling the copolymer with from about 5% to about 25% by weight thereof of a blown oil capable of producing a factice and having a viscosity of from about 10 to about 20 poises at 72° F.

5. The method of forming a composition of the rubbery copolymer of butadiene-1,3 and styrene which comprises milling the copolymer with from about 5% to about 25% by weight of a mixture composed of approximately equal parts by weight of rosin and a blown oil capable of producing a factice having a viscosity of from about 10 to about 20 poises at 72° F.

6. A compound of the rubbery copolymer of butadiene-1,3 and styrene containing blown linseed oil as a plasticizer therefor, said linseed oil having a viscosity of from about 10 to about 20 poises at 72° F., and being in the proportion of from about 5% to about 25% by weight of the copolymer.

7. A compound of the rubbery copolymer of butadiene-1,3 and styrene containing blown linseed oil as a plasticizer therefor, said linseed oil having a viscosity of from about 10 to about 20 poises at 72° F., and being in the proportion of from about 10% to about 20% by weight of the copolymer.

8. A compound of the rubbery copolymer of butadiene-1,3 and styrene containing a plasticizer therefor composed of approximately equal parts by weight of rosin and blown linseed oil having a viscosity of from about 10 to about 20 poises at 72° F., the plasticizer being in the proportion of from about 5% to about 25% by weight of the copolymer.

IZADOR J. NOVAK.